United States Patent
Moore

(10) Patent No.: US 8,117,266 B2
(45) Date of Patent: Feb. 14, 2012

(54) INTEGRATED MOBILE MESSAGING SYSTEM AND METHOD

(75) Inventor: Terrill M. Moore, Trumansburg, NY (US)

(73) Assignee: Moore Computer Consultants, Inc., Ithaca, NY (US)

( * ) Notice: Subject to any disclaimer, the term of this patent is extended or adjusted under 35 U.S.C. 154(b) by 1454 days.

(21) Appl. No.: 10/891,169

(22) Filed: Jul. 14, 2004

(65) Prior Publication Data

US 2005/0037801 A1 Feb. 17, 2005

Related U.S. Application Data

(60) Provisional application No. 60/486,991, filed on Jul. 14, 2003.

(51) Int. Cl.
- G06F 15/16 (2006.01)
- H04M 1/00 (2006.01)
- H04M 1/725 (2006.01)
- H04M 11/00 (2006.01)

(52) U.S. Cl. ............ 709/206; 455/412.1; 455/550.1; 379/93.01

(58) Field of Classification Search .......... 709/206; 455/550.1, 412.1; 379/93.01
See application file for complete search history.

(56) References Cited

U.S. PATENT DOCUMENTS

| | | | |
|---|---|---|---|
| 5,604,788 A | 2/1997 | Tett | |
| 5,611,055 A * | 3/1997 | Krishan et al. | 710/301 |
| 5,742,905 A | 4/1998 | Pepe et al. | |
| 6,125,281 A | 9/2000 | Wells et al. | |
| 6,289,464 B1 * | 9/2001 | Wecker et al. | 713/300 |
| 6,360,272 B1 | 3/2002 | Lincke et al. | |
| 6,401,112 B1 | 6/2002 | Boyer et al. | |
| 6,438,585 B2 | 8/2002 | Mousseau et al. | |
| 6,523,073 B1 | 2/2003 | Kammer et al. | |
| 6,590,588 B2 | 7/2003 | Lincke et al. | |
| 6,640,242 B1 * | 10/2003 | O'Neal et al. | 709/206 |

(Continued)

FOREIGN PATENT DOCUMENTS

WO WO03/019319 A2 3/2003

OTHER PUBLICATIONS

Lee, William C. Y., Mobile Cellular Telecommunications: Analog and Digital Systems, 1995, McGraw-Hill, Inc., New York, NY, U.S.A.

(Continued)

*Primary Examiner* — Kevin Bates
*Assistant Examiner* — Robert B McAdams
(74) *Attorney, Agent, or Firm* — Cesari and McKenna, LLP

(57) ABSTRACT

A hand held device, much like a cell phone or PDA, contains both a data server and a data client along with the voice messaging of a cell phone. The data server communicates through a TCP/IP stack with a local computing system via IR, short distance wireless, a serial bus or Ethernet. The data client communicates with a remote server via a voice network or wireless to the Internet also via a TCP/IP stack and a wide area network. Spare network bandwidth may be used for transferring information. The information may include emails that are received and stored for later review for ultimately transferring to a local computer. Status may include knowing available memory and message sizes. Message that are too large may be noted for later retrieval. On-board memory includes RAM. ROM, and removable modules that may be physically removed and run at a local computing system.

21 Claims, 9 Drawing Sheets

U.S. PATENT DOCUMENTS

| | | | |
|---|---|---|---|
| 7,212,785 B2 * | 5/2007 | Brassil et al. | 455/41.2 |
| 2002/0058499 A1 * | 5/2002 | Ortiz | 455/412 |
| 2002/0129107 A1 | 9/2002 | Loughran et al. | |
| 2002/0163780 A1 | 11/2002 | Christopher | |
| 2003/0023435 A1 | 1/2003 | Josephson | |
| 2003/0045311 A1 | 3/2003 | Larikka et al. | |
| 2003/0055902 A1 * | 3/2003 | Amir et al. | 709/206 |
| 2003/0236933 A1 * | 12/2003 | Shigeta et al. | 710/72 |

OTHER PUBLICATIONS

Hild, Stefan G. et al., Mobilizing Applications, IEEE Personal Communications, Oct. 1997, vol. 4, No. 5.

International Search Report dated Nov. 18, 2004 for Corresponding PCT Application Serial No. PCT/US2004/022642.

* cited by examiner

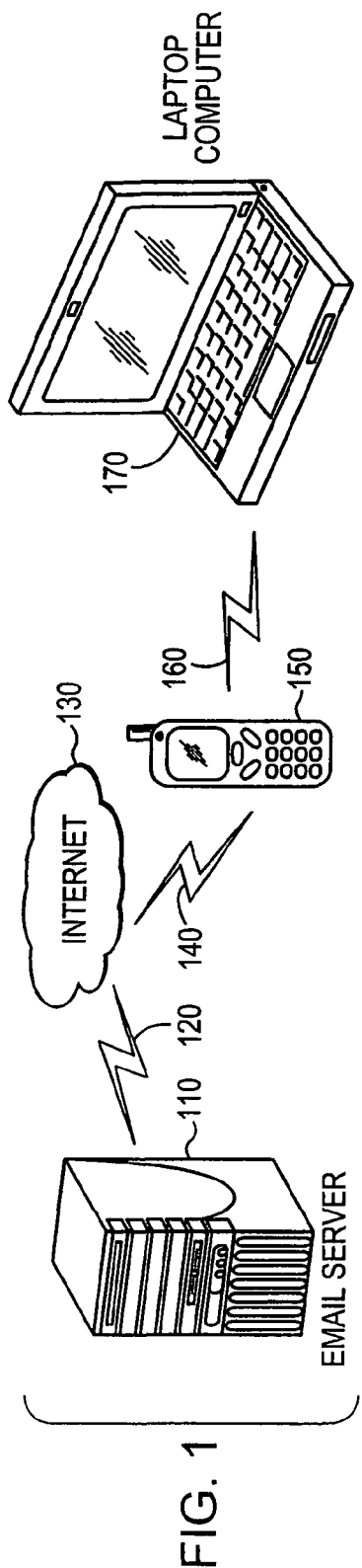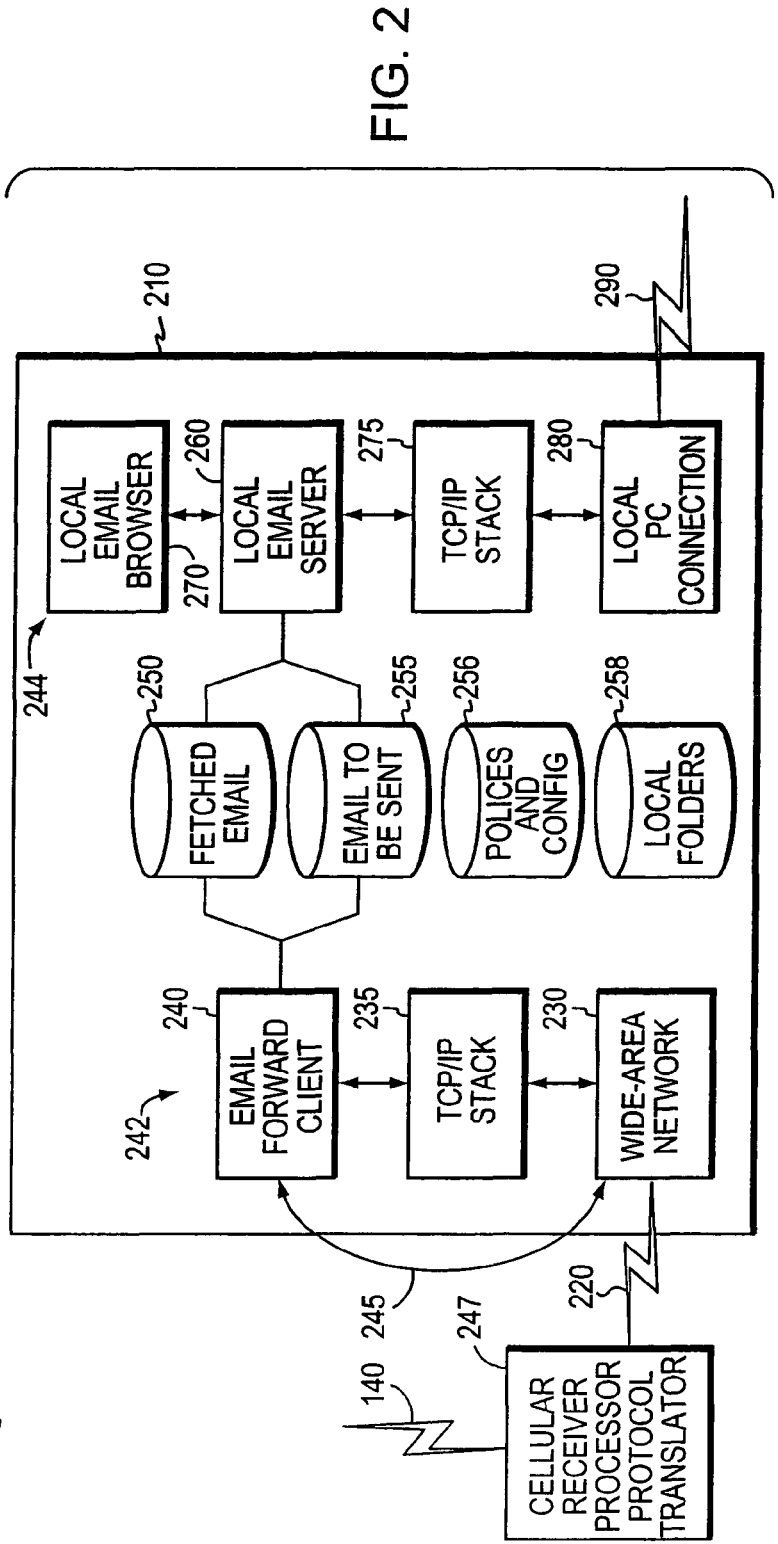

INTEGRATED MOBILE MESSAGING SYSTEM AND METHOD

RELATED APPLICATIONS

The present application is related to and claims priority from a provisional application of common title, inventorship and ownership as the present application. That provisional was filed Jul. 14, 2003, bears the Ser. No. 60/486,991, and is hereby incorporated herein by reference.

BACKGROUND OF THE INVENTION

1. Field of the Invention

The present invention relates to systems and methods for using hand held devices as mobile messaging terminal systems, and more particularly messaging systems incorporating many different message types and functions resident on a hand held platform.

2. Background Information

There has been an explosion in the use of hand held personal assistants (PDA'S), cell phones, mobile laptop and fixed computer hardware connected in various ways to cellular (voice) networks and the Internet for email and other information. Cellular networks include analog and digital types and the digital types include a number of different types and protocols.

For the digital cellular networks the more popular systems and protocols include TDMA (time division multiple access), GSM (Global System for Mobil—a TDMA system), CDMA (code division multiple access) and others that are evolving. Analog and digital mobile communication systems well known in the art are covered in many publications. One early book that describes the fundamentals is Mobile Cellular Telecommunications, authored by William C. Y. Lee, published by McGraw-Hill, Inc., 1995, especially chapters 14-17.

Known cell phone devices typically have displays, keyboards, batteries, computing processors, wireless communications, I/O (input/output) connections, software operating systems, I/O drivers and applications to extract information from data framed by different protocols. Typically the I/O includes hardware serial ports connections to laptops or personal computer systems.

For example, U.S. patent application publication no. US2002/0129107 A1 to Loughran et al. (Loughran) describes one such arrangement. Here, a cell phone, arranged as a GSM device, is connected to a notebook computer. A server sends a message to the cell phone via a cellular network, notifying the user (of the notebook) that an email is waiting. The cell phone may power up the notebook and the email is downloaded. The cell phone to notebook connection might be wireless, and the email may be a software upgrade. In these cases the cell phone is able to operate under the various protocols that may be involved. The cell phone will be made aware by the notifying message—usually an SMS (short message system) under the GSM standard.

However, in Loughran publication the cell phone is always attached to and functionally a part of the notebook computer acting as a wireless modem I/O device. Both are on using battery power.

Another recent example, U.S. patent application publication No. US2003/0045311 A1 to Larikka et al. (Larikka) similarly describes a cell phone permanently connected to a personal server (computer) via a serial connection, IR, USB or Bluetooth. Again the cell phone is acting as a modem I/O connection between a mobile network, a cellular network, and the personal server. There is a remote server across the Internet connected through a gateway to the mobile network. Larikka is using the system primarily to pass synchronization messages.

As in the Loughran system the cell phone acts as an I/O device to the notebook or personal server, and both are powered on.

In both of the above patent publications, the cell phone is connected to the notebook or personal server which must be connected and powered to down load email or data from the cell phone. The battery power of the laptop is always on and being depleted. Also, since the phone must be connected to the laptop, the phone is not free to travel too far from the laptop. The laptop can be carried, but laptops are quite heavy and not as mobile or convenient compared to a cell phone that can be carried in a shirt pocket.

The above references and others in this field have not realized the advantages of the present inventive hand held messaging system that can be operated as an independent, obviously small, power efficient, client and server for messages, data and other such information. Prior art inventions missed the multi-dimensions performance of the present invention, especially when large amounts of memory are becoming increasingly cheaper and smaller.

SUMMARY OF THE INVENTION

In view of the foregoing background discussion, the present invention provides an easily carried cell phone sized hand held device with increased amounts of memory that provides both an email or data server and/or an email or data client together with a voice system. Herein "information" standing alone is defined to include emails, data, or voice information, or any combinations thereof, unless further distinguished. Also, data, unless further defined, refers at least to any of applications, text, code listings, or databases, or combinations thereof, unless further distinguished.

Email or data information is received over a cellular network and stored in the hand held device. The presence of the e-mail or data may be monitored on a cell phone display. The user may answer or otherwise handle the message directly with the hand held device. Stored responses may be triggered or the information deleted. A keypad may also be used to compose response. The response may be to either the remote server or the local computing system. When convenient, the user may download the email or data to a local computer via a wireless or wire connection.

The hand shaking (the two way communications of commands: informing one that information is ready for sending, sent, received, stored, the command to send, error messages, and the acknowledgement of receipt) between the clients and servers over the communications link to the Internet or the transferring link to the local computing system is a function of the protocols used. Such are well known in the art. Moreover, encryption as commonly used with these protocols may used to advantage with the present invention and standard software modules may be installed in the mobile messaging terminal (MMT) to accomplish such protection as desired—again such techniques and use of such modules are well known in the art.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is to be defined as only set forth in the accompanying claims.

BRIEF DESCRIPTION OF THE DRAWINGS

The invention description below refers to the accompanying drawings, of which:
FIG. 1 is block diagram of a communications system incorporating the invention;
FIG. 2 is a combination software block diagram.

DETAILED DESCRIPTION OF AN ILLUSTRATIVE EMBODIMENT

Figure 3:
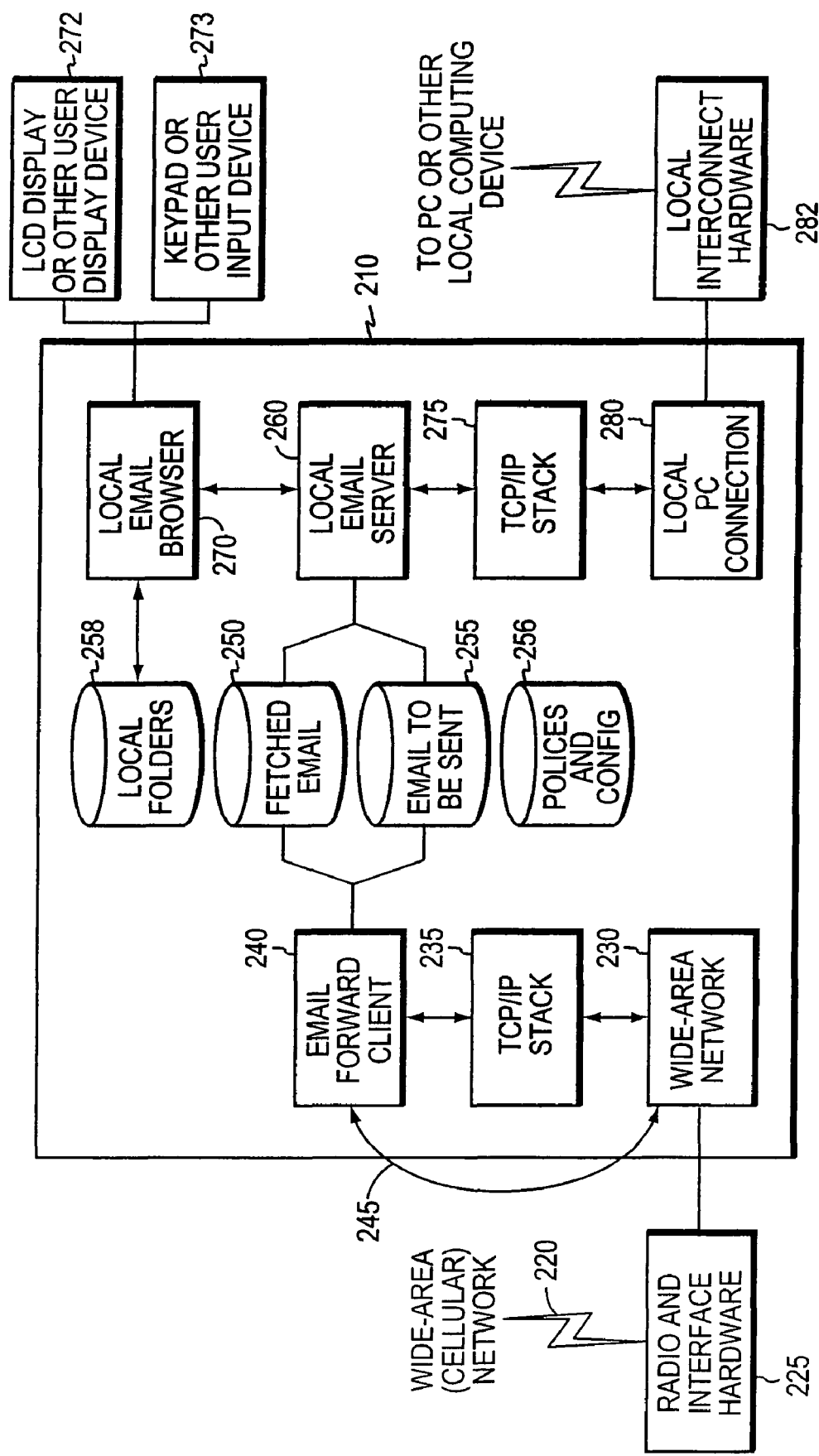
FIG. 3 is a hardware block diagram of the hand held device.

FIG. 1 shows an email server 110 communicating 120 via the Internet 130 as is well known in the art. The communicating 120 can be via a hard wire connection via one of the Internet service providers (ISP's) running the email protocol. The communication connection 120 may also be via a wireless link as are well known in the art, e.g. WiFi at a hot spot or via a cell phone network running one of the standard protocols, GSM, 3G, CDMA, or TDMA.

The Internet 130 is accessed by the inventive hand held device 150 via a wireless link 140, which also may be a WiFi type connection. The hand held device 150 communicates with a laptop computer 170 via a communication link 160. This link 160 may be a universal serial bus (USB), Ethernet, infra-red (IR), and/or short distance wireless Bluetooth®. The USB Communications Device Class (CDC) Abstract Control Model (ACM) or the Ethernet Control Model (ECM) acting as a serial bus are the preferred choices, and are well known in the art. The device drivers (the software that operates the various devices and communications ports), in preferred embodiments, perform any needed protocol transformations, that is adding framing or stripping framing data, etc. from the messages.

Also, the link 140 may be a two stage arrangement, as discussed below, where the hand held device communicates over a cellular network to an Internet access device connecting the Internet to the cellular network. Such arrangements and devices are known in the art.

FIG. 2 illustrates the software components resident in the hand held device 150. The Wide-Area Network (WAN) 230 is shown with a link 220 meant to communicate preferably with a digital voice cellular network. With this arrangement a receiver and protocol translator 247 on the cellular network will answer and provide the interface connection 140 to the Internet via known techniques. The receiver will re-format the data to and from the hand held device 150 and to and from the Internet. The hand held device may be arranged to accept the common TCP/IP formatted data stream, but FTP or other formats can be accommodated, again as is well known in the art.

The stack arrangement 242 and 244 in FIG. 2 shows the familiar protocol layering structure used to describe information interchange over the Internet. Well understood features of the seven or in this case five layer model is that each layer need only understand the format of the adjacent layers. So the email applications, which may include the well known Eudora, Outlook, or Groupwise systems, do not care about the physical connectivity—that is for the lower layers. Each layer adds framing or encapsulation as it sends a message down the layers and strips it off from messages coming up the layers. The encapsulated data, typically, is undisturbed. The TCP/IP 235 and 275 each interface between an application layer email client 242 and the email server 260. The IP (datagram layer) 235 and 275 transform data between the TCP and the device driver layers, again encapsulating and unencapsulating. The device drivers physically drive the actual hardware—wireless, USB, Ethernet, etc.

Still referring to FIG. 2, note that there is an email forward client 240 and an email local server 260. The hand held device provides both server and client functions.

The email client 240 may communicates directly 245 with the WAN to monitor the status and availability of the WAN connection. That is if the connection is active or needs to be dialed, etc. The email client 240 may be programmed to connect to the email server 110 and inquire or interrogate of the server about new email messages. The client 240 may then command the server to send the email message that is received via the WAN and stored 250 in the hand held device. There are known "policies" for handling these transfers, SMTP, IMAP, sendmail, POP3 (post office protocol version 3) servers, etc. Outgoing emails stored in the hand held device 255 may then be sent to the recipients on the Internet 120 via the WAN. Once sent this storage space is free of other messages. One typical arrangement is for the email to be arranged as a TCP message with an IP address running SMTP (simple mail transfer protocol). This protocol retains a copy of the message at the server until a acknowledgement is sent that the message was properly received. However, other transfer protocols, like FTP (file transfer protocol) may be used as are known in the art.

Still referring to FIG. 2, the local server 260 is set up in such a way to appear to the PC as a traditional email server. Messages are downloaded to the PC using a standard protocol such as POP3 and uploaded to the PC using a standard protocol such as SMTP.

The email forward client uses the TCP/IP stack 235, in this preferred embodiment, to communicate with the Internet 130 via the WAN 230. Of course as other protocols are developed they may be used to advantage with the present invention.

The email client and later discussed email server 260, usually via the hand held device's operating system, monitor the battery level to ensure that proper receiving and sending can be accomplished. If not, usually the emails are not sent or received and the user is warned to charge the batteries.

Still referring to FIG. 2, the local email server 260 has access to both the stored received 250 and outgoing 255 email messages. As determined from the local email browser 270 and the information in the TCP/IP stack 275 that was set up by the laptop via the local PC connection 280 via the interconnect 290, the local email server 260 will: a) allow the local browser 270 to review the status of the received 250 and the outgoing 255 emails messages; b) download the received email and deleting if desired from the storage 250; c) to transfer the email messages from the storage 250 and/or 260 to the local folder 258 storage area, this transfer mechanism may be resident in the local browser 270; d) receive message received from the local browser, these message generated by the user on the I/O of the hand held device; and e) receive email messages from the local PC for transmission to the Internet. These outgoing message may be arranged for any protocol, e.g. SMTP, POP3, IMAP, etc.

FIG. 3 depicts a typical I/O hardware showing the logic connections to the operating software modules within the block 210. This drawing shows the full five layer protocol, with the TCP/IP layer counting as two layers. Here the RF and antenna 225 and the Local Interconnect Hardware 282 form the fifth layer. In addition, preferably, there is an LCD display 272, a keypad or other known entry device 273; and the physical connection 282 to the local PC. This connection as suggested before may be a hardwire USB, Ethernet, a UART or other serial-type connection, or a wireless IR or other short distance wireless.

Figure 4A:
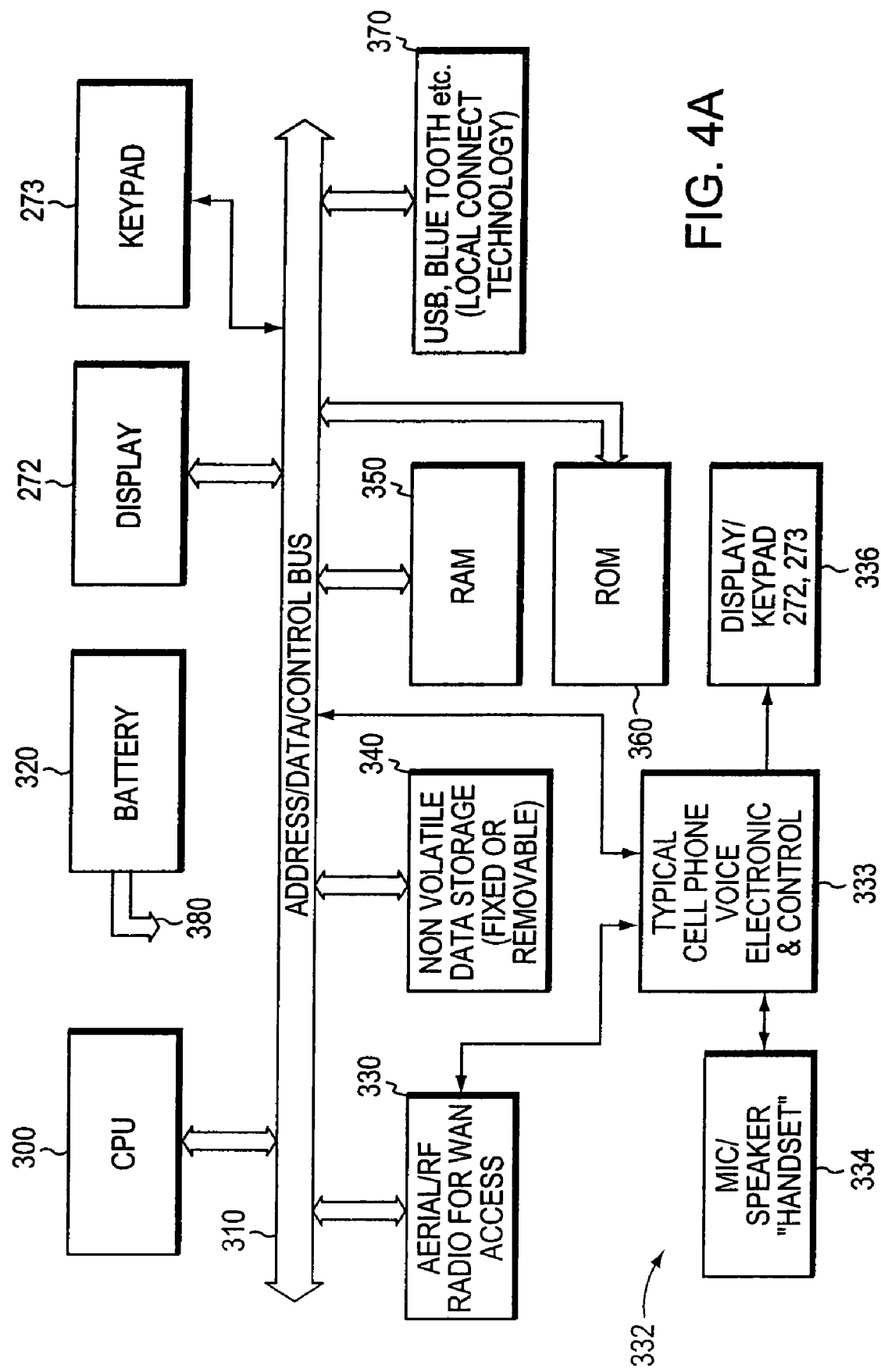
FIGS. 4A and 4B are the software/hardware block diagrams of a preferred embodiment of the invention.

With reference to FIG. 4A, a CPU 300 performs the calculations and logic for the handheld device including all the message formatting, sending, receiving, etc. A battery 320 powers 380 all the hardware modules. The battery type is well known in the art for cell phones/PDA's, etc. There is a common connection 310 for control, data and addressing 310 among the major hardware modules as shown. Those module include the display 272, the keypad 273, the connection to the local PC 370, the RAM 350, the ROM 360 non-volatile storage 340 and the physical RF/Aerial for the WAN connections 330. Other hardware modules, like cache and interrupt register stacks, common in such devices may be used to advantage as is known in the art.

The computers that control the communications, in a preferred embodiment, will use spare or unused and therefore available network bandwidth on an as available basis for communicating information.

The storage device 340 may be removable allowing the memory itself to be removed and brought to a PC or other computer for downloading data or emails. Additionally a removable memory may be remotely loaded with updated software, emails or data destined for remote locations and replaced into the hand held device whereupon it is sent or used as determined by the user.

The memory device used for storage 340, 350 and 360 may be of any types commonly available, but certainly flash memory is an obvious choice as it does not require battery backup. Denser ROM's, RAM's or other volatile and non-volatile memory devices may be used as they are developed. Moreover, as chips become available that combine the portions of the traditional modules shown in FIG. 4 become available they can be incorporated into the design of the hand held device.

In addition, the present invention includes the typical cell phone voice capabilities. These capabilities 332 are well known and are only briefly described herein. The audio is extracted from the RF 330. Although the voice system may be arranged separately from the mobile messaging terminal (MMT), the preferred embodiment would have the MMT embedded into the cell phone. In that case the cell phone control 333 would share the CPU 300 with the MMT and the handset, the speaker and microphone, 334 may run from the bus 310 or from the control 333 as shown. The display 272 and the keypad 273 may function for voice functions directly 336 from the cell phone control or from the bus 310. If additional functions, like that of personal data accessory (PDA), are embedded in the cell phone the MMT may borrow from both, stand alone or be embedded in either function. For example the status of email or data stored in the MMT may be viewed on the display, and responses previously stored may be keyed and triggered and the keypad may be used to compose some responses that are then sent. These response may be to either the remote server over the Internet or the local computing system over the USB. Such implementations are well known in the art.

Figure 4B:
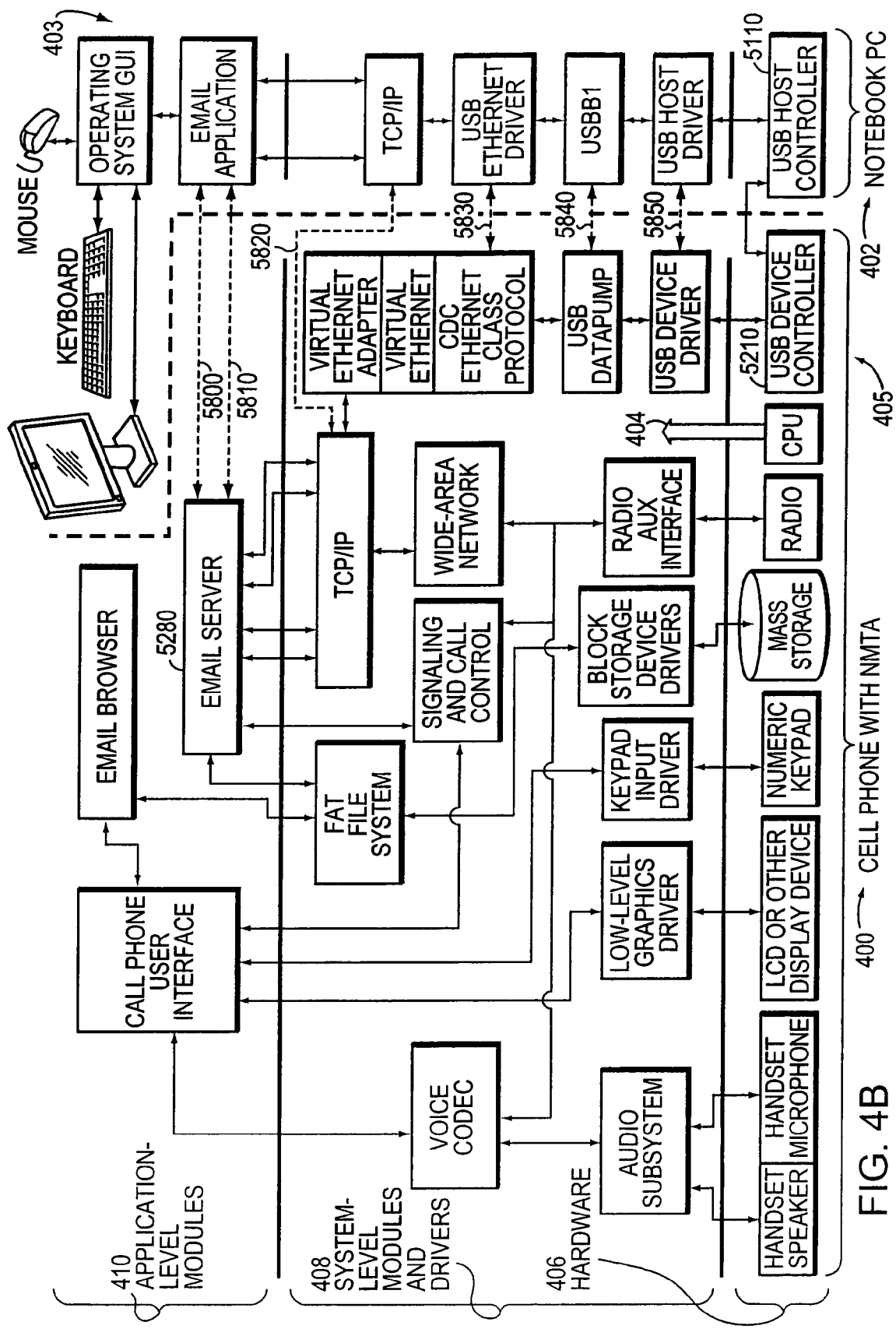

FIG. 4B shows a more detailed hardware/software block diagram of a preferred embodiment of the present invention. The cell phone MMT device 400 is shown communicating with the laptop or notebook PC 420 via an email application on a TCP/IP layer 403 to an email server 5280 on a corresponding TCP/IP stack 405. As is well known the message path in the PC runs down to the USB controller 5110 physically to the corresponding USB controller 5210 in the MMT and up to the email server 5280. A CPU 404 is connected to and controls the entire MMT operations. As discussed before the lower layers add encapsulation framing that is removed as the message travels up through the layers.

The MMT is illustrated with the hardware modules 406, the system level software modules and drivers 408 and the application level modules 410. This organization is roughly that of the five layer communication protocols well known in the art. The labels are self explanatory except the FAT file system 5400, can be any suitable file system, and CODEC 5620 is a well known acronym. The dotted arrows 5800, 5810, 5820, 5830, 5840, and 5850 indicate locations of equivalent encapsulated messages, not actual interconnections.

Figure 5:
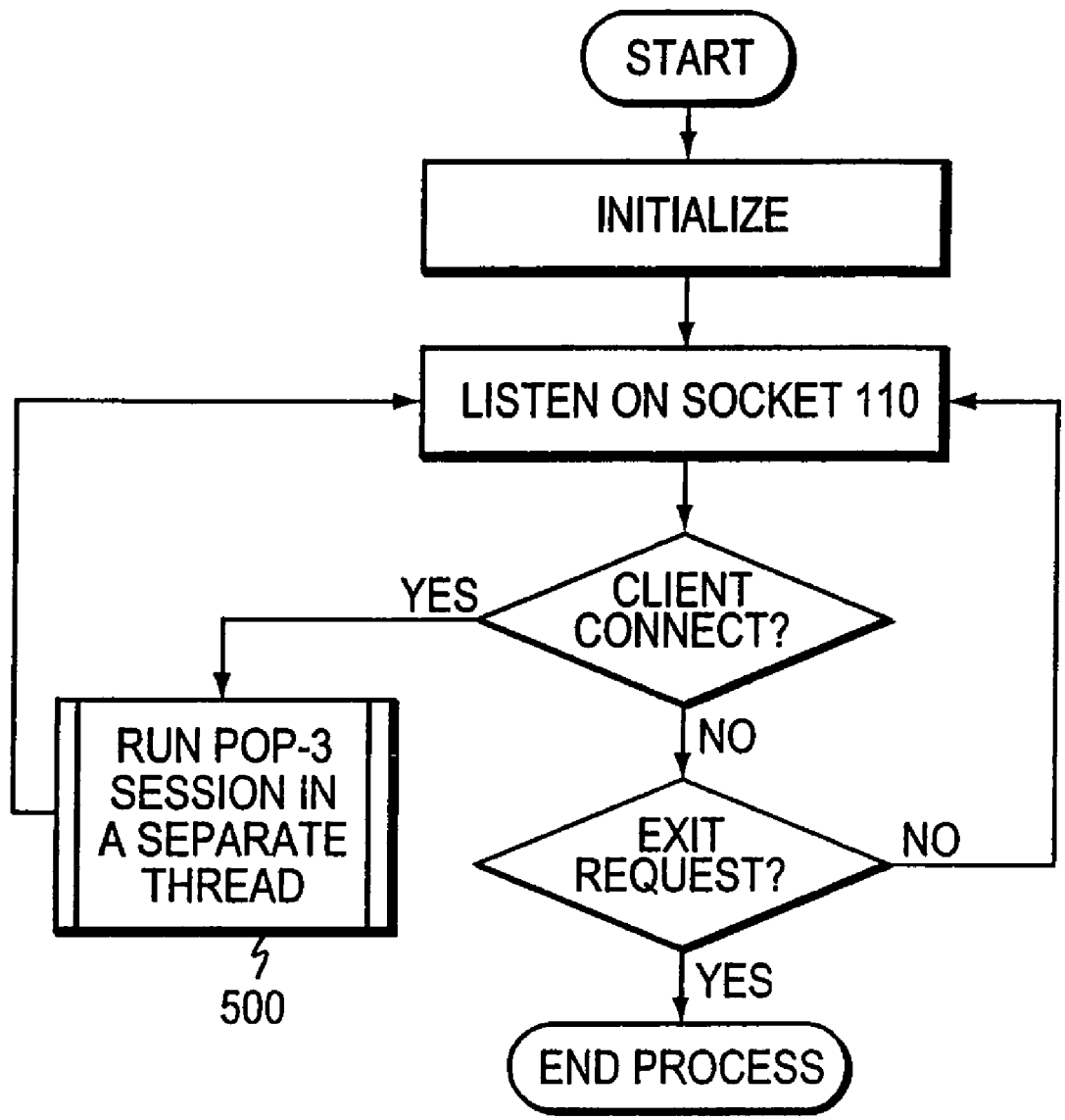
FIG. 5 is a flow chart of a POP server.

FIG. 5 is a flow chart of a typical post office protocol (POP) server. This server is preset up on socket 110 by the POP standard. The box 500 illustrates running the POP application as a task operation or thread. The thread may be driven and/or shared by other operations as is well known by system software developers. It may use interrupts, flags, clocks, etc. as are well known in the art.

Figure 6:
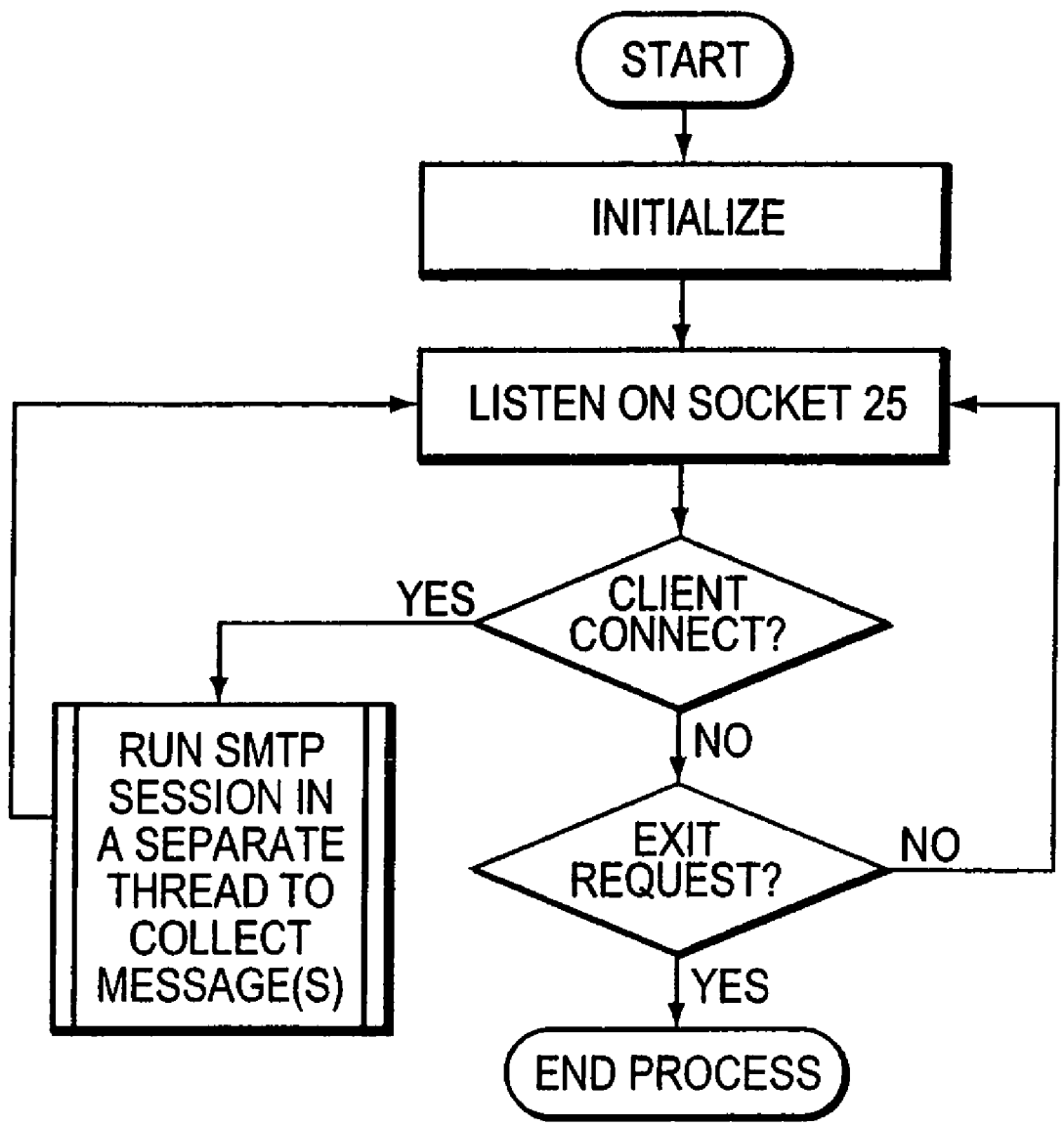
FIG. 6 is a flow chart of an SMTP server.

FIG. 6 shows the simple mail transfer protocol (SMTP) server. These operations are also well known.

Figure 7:
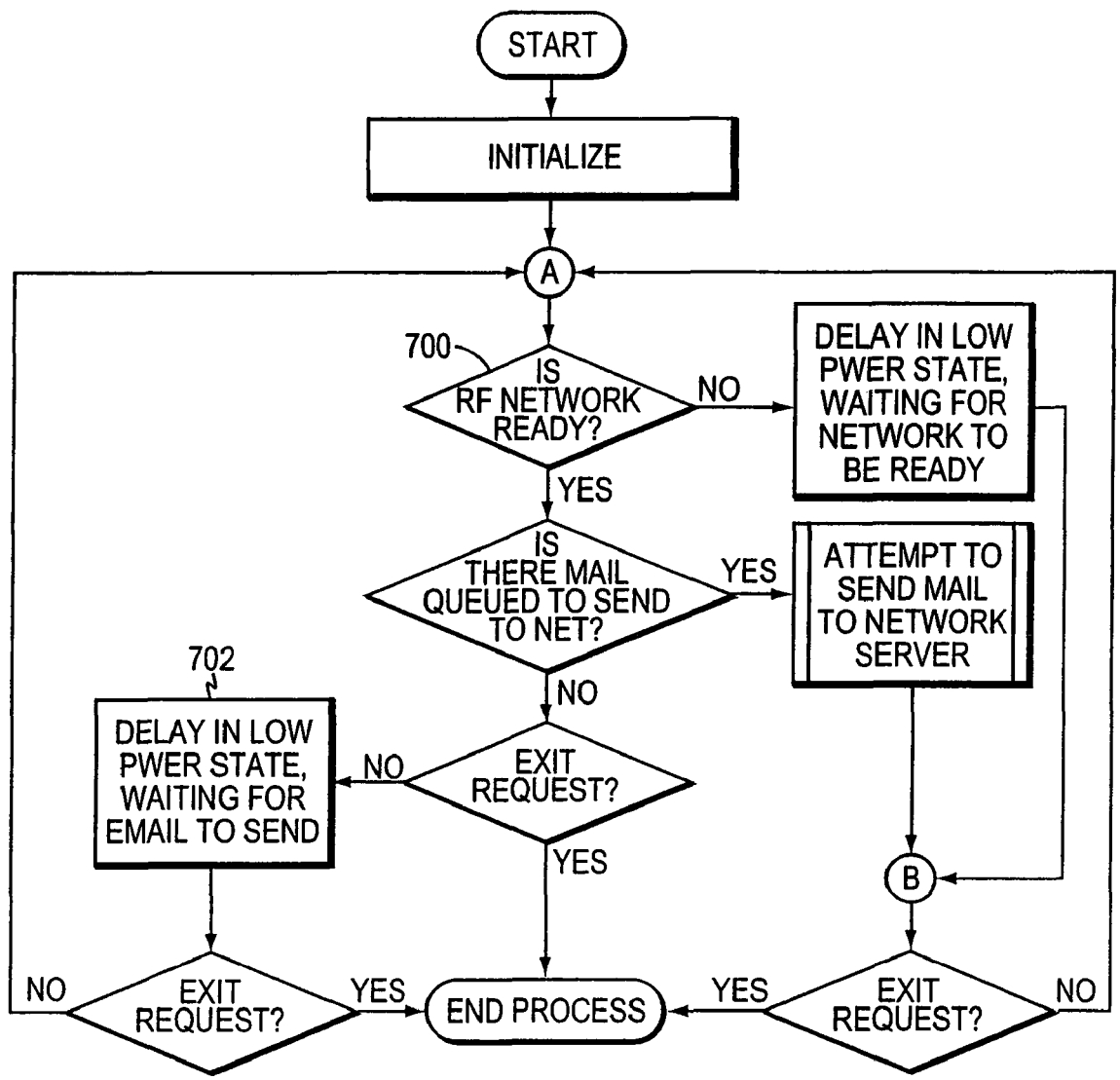
FIG. 7 is a flow chart of an email forwarder.

FIG. 7 is a flow chart of an email forwarder. The labels are self-explained. This drawing shows the direct status connections between the email client 242 and the Wide-Area Network 230 of FIG. 2. Also, the checking of the battery power 702 is shown.

Figure 8:
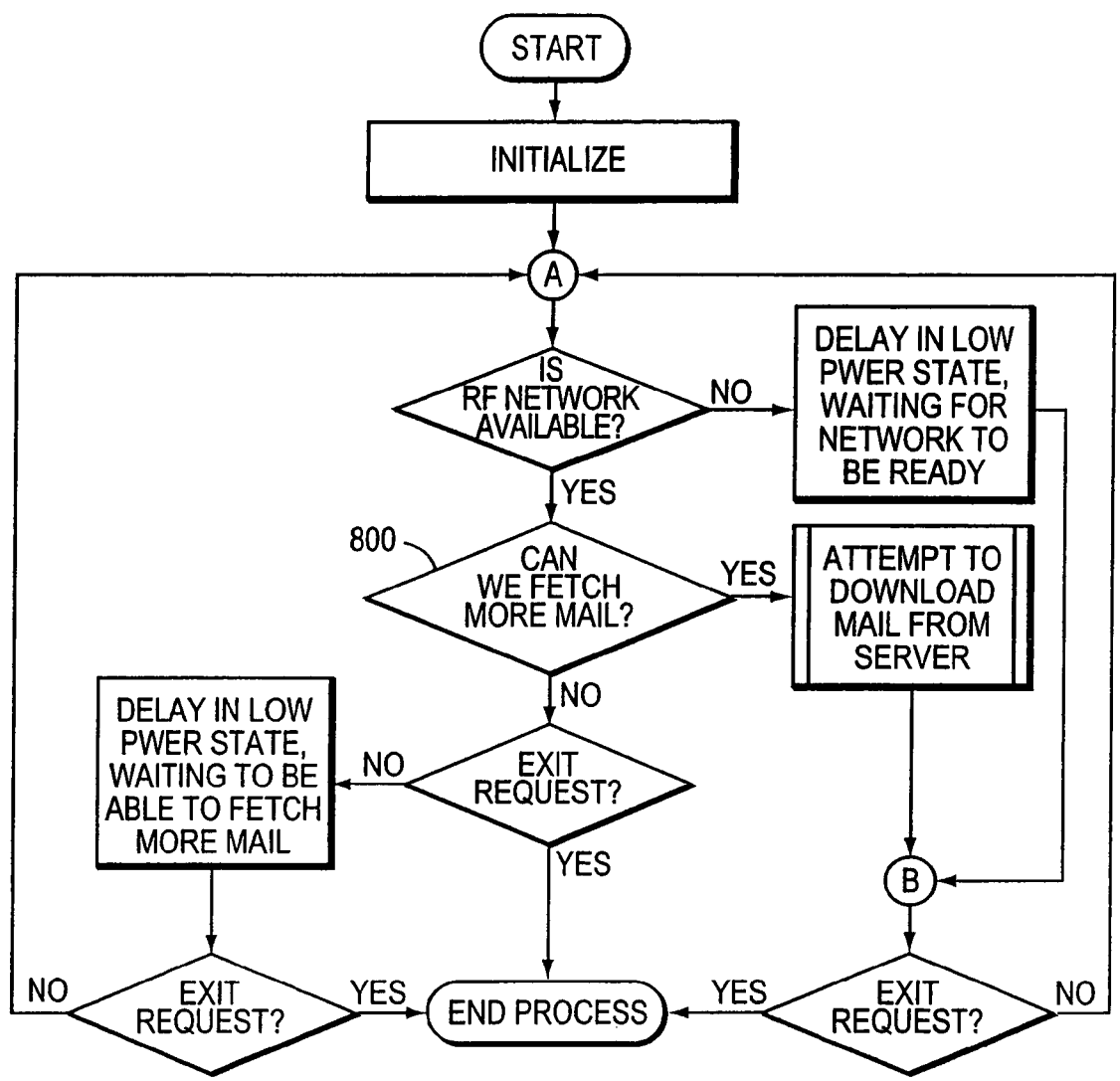
FIG. 8 is a flow chart of an email fetcher.

FIG. 8 is the corresponding flow chart of the email fetching. Again battery power levels is checked, and the block 800 entails examining available storage space in the MMT and comparing it to the size of the email to be received. If there is not enough storage space, the MMT waits until space becomes available.

Figure 9:
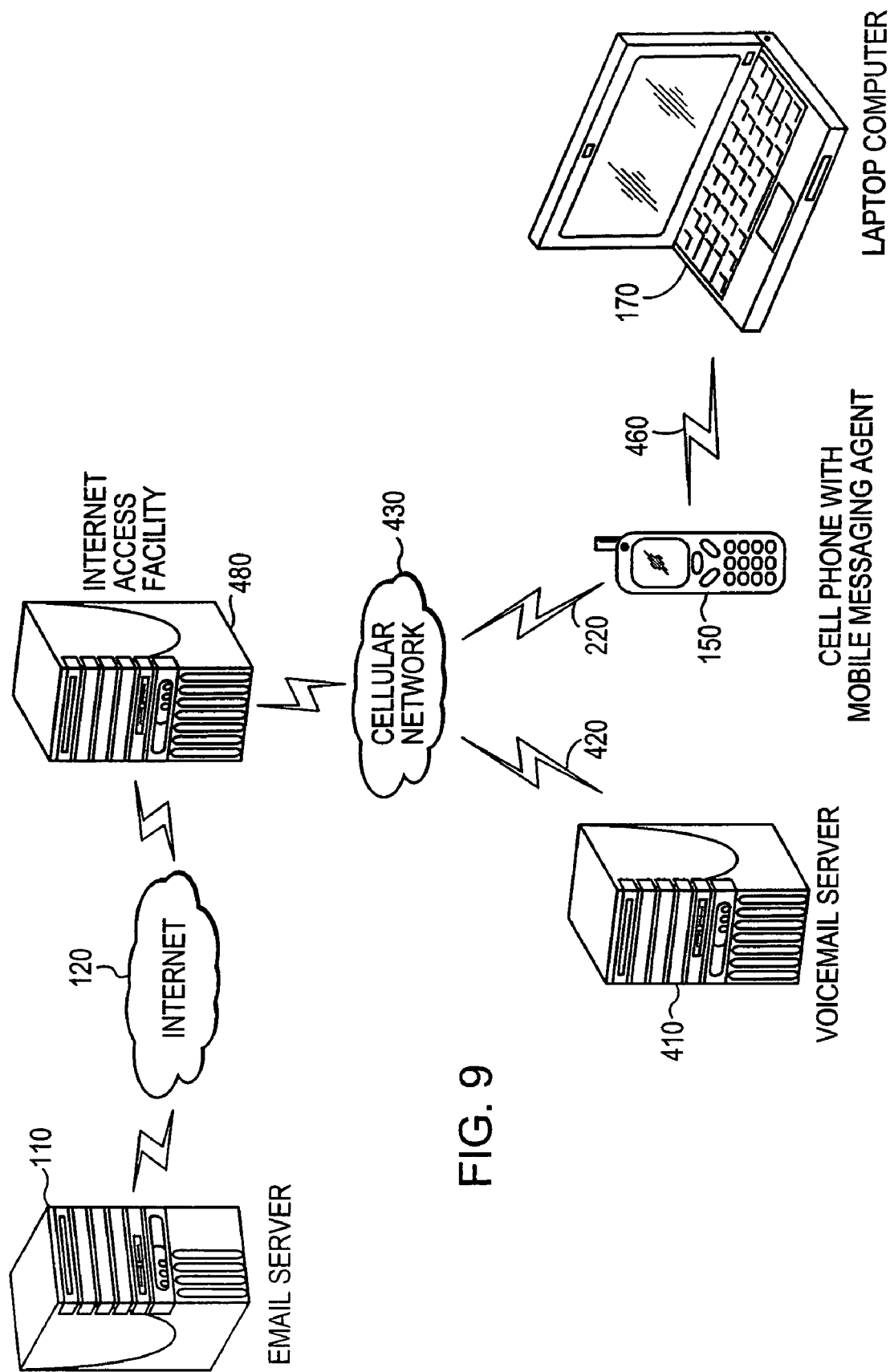
FIG. 9 is a block diagram of the system using the cellular network.

FIG. 9 shows the WAN connection 440 to a voice or cellular network 430 with a voice mail server 410 and an Internet access facility 480 that interconnects the cellular network to the Internet 120.

The inter-action of the user and the hand held MMT device with respect to prompts and commands may follow any of the scenarios typically found in PDA's, cell phones, and the like. Such design is well understood in the art.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A hand held device, comprising:
   means for communicating information comprising one or more of emails, voice, databases, and data over a wireless network to a remote server, wherein the information is communicated using one of several standard protocols associated with the type of information being communicated;
   means for transferring information with a local computing system client,
   an information client arranged for interrogating and receiving information from the remote server;
   an email server arranged for listening to and sending information to the local computing system client using one of several standard email protocols associated with the information being communicated, receiving information to be provided to the remote server from the local computing system client and the information client, and managing the information received from the local computing system, the information client and the remote server to control the transferring of the information to the information client, the local computing system client and the remote server, and the storing and deleting of the information at the hand held device; and means for storing the information being managed in the hand held device.

2. The device of claim 1 further comprising:

means for displaying the status of information at the remote server meant for sending to the hand held device;

means for displaying the status of information stored in the hand held device; and means for composing responses and activating commands via both the means for communicating and the means for transferring, wherein information is at least one of sent, received, acknowledged, and stored.

3. The device of claim 1 further comprising means for determining available storage space and the size of messages to be stored in the device, wherein the presence of a too large message is saved.

4. The device of claim 1 wherein the means for transferring comprises a removable memory configured to store the information, wherein the memory is further configured for removal from the hand held device and for insertion at the computing system to access the information.

5. The device of claim 1 wherein the means for transferring comprises at least one of a USB, Ethernet, short distance wireless, infra red, and UART.

6. The device of claim 1 wherein the information communicated uses at least one of spare network bandwidth and capacity to transfer the information on an as available basis.

7. The device of claim 1 further comprising:

a TCP/IP stack layer configured to communicate with the information client;

a wide area network module configured to communicate with the TCP/IP stack layer; and a radio frequency communications device and aerial for wireless communication, the radio frequency communications device configured to communicate with the wide area network module, wherein information is received by and sent from the information client via the radio frequency communication device, the wide area network module, and the TCP/IP stack layer.

8. The device of claim 1 further comprising:

a TCP/IP stack layer configured to communicate with the information email server;

a local computer system module configured to communicate with the TCP/IP stack layer; and a local hardware system configured to communicate with the local computer system module, wherein voice and data information is received by and sent from the email server via the local hardware system, the local computer system module, and the TCP/IP stack layer.

9. A method for communicating from an internet to a computing system via a hand held device, comprising:

two way communicating information, the information comprising email, voice, databases and data over a wireless network between a remote server and the hand held device, wherein each type of information is communicated using one of several standard protocols associated with the type of information being communicated;

transferring the information with the computing system, wherein at least one of the emails, voice, databases and data is communicated using one of several standard email protocols associated with the type of information being communicated;

interrogating and receiving the information from the remote server, the interrogation and receiving performed by an information client;

listening and sending the information to and from the computing system, the listening and sending performed by an email server of the hand held device;

managing, by the email server, the information to control the transferring, storing and deleting of the information received from and sent to the computing system, the information client and the remote server; and storing the information being managed in the hand held device.

10. The method of claim 9 further comprising:

displaying status of the information at the remote server meant for sending to the hand held device;

displaying the status of the information stored in the hand held device; and composing responses and activating commands, wherein information is at least one of sent, received, acknowledged, and stored.

11. The method of claim 9 further comprising determining available storage space and a size of a message to be stored in the hand held device, wherein presence of a too large message is saved.

12. The method of claim 9 wherein the transferring comprises removing, from the hand held device, memory upon which the information is stored, and inserting the memory at the computing system for accessing the information.

13. The method of claim 9 further comprising providing, by the hand held device, functions of the email server to the computing system.

14. The method of claim 9 further comprising:

communicating with the information client via a TCP/IP stack layer of the hand held device;

communicating with the TCP/IP stack layer via a wide area network module of the hand held device; and communicating with the wide area network module via a radio frequency communications device and aerial, wherein the information is received by and sent from the information client via the radio frequency communication device, the wide area network module, and the TCP/IP stack layer.

15. The method of claim 9 further comprising:

communicating with the email server via a TCP/IP stack layer of the hand held device;

communicating with the TCP/IP stack layer via a local computer system module; and communicating with the local computer system module via a local hardware system, wherein the information is received by and sent from the email server via the local hardware system, the local computer system module, and the TCP/IP stack layer.

16. The method of claim 9 wherein communicating the information comprises using at least one of spare network bandwidth and capacity to transfer the information on an as available basis.

17. The hand held device of claim 1 wherein the hand held device acts as an email client to the remote server.

18. The method of claim 9 further comprising the hand held device acting as an email client to the remote server.

19. A hand held device, comprising:

wireless communications means for receiving and transferring information with a remote server;

an information client for communicating with the remote server over the wireless communications means;

means for receiving and transferring the information with a local computer system client;

an email server for managing the information received from and transferred to the local computer system and the remote server using one of several standard email protocols, the email server configured to, fetch, respond to, retain, and delete information transferred from the remote server, and further configured to transfer, retain, and delete information received from the local computer system client, and further configured to transfer the information received from the information client.

20. The device of claim 19 wherein the email server is further configured to manage a status of the information fetched and to be transferred.

21. The device of claim 19 wherein the information comprises at least one of email, voice, databases, and data.

* * * * *

UNITED STATES PATENT AND TRADEMARK OFFICE
CERTIFICATE OF CORRECTION

PATENT NO.        : 8,117,266 B2
APPLICATION NO.   : 10/891169
DATED             : February 14, 2012
INVENTOR(S)       : Terrill M. Moore Page 1 of 1

It is certified that error appears in the above-identified patent and that said Letters Patent is hereby corrected as shown below:

Title Page, Item [57] Abstract, beginning of line 8, "are network" should be --area-- network;
Title Page, Item [57] Abstract, line 12, "Message" should be --Messages--;
Column 5, line 43, FIG. 4 should be FIG. --4B--;
Column 7, line 54, delete "information".

Signed and Sealed this
Seventeenth Day of April, 2012

David J. Kappos
*Director of the United States Patent and Trademark Office*